UNITED STATES PATENT OFFICE.

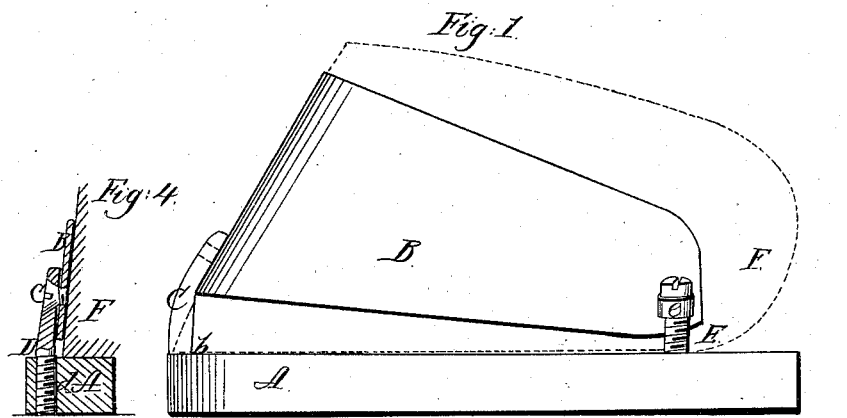
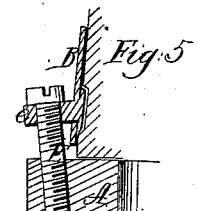
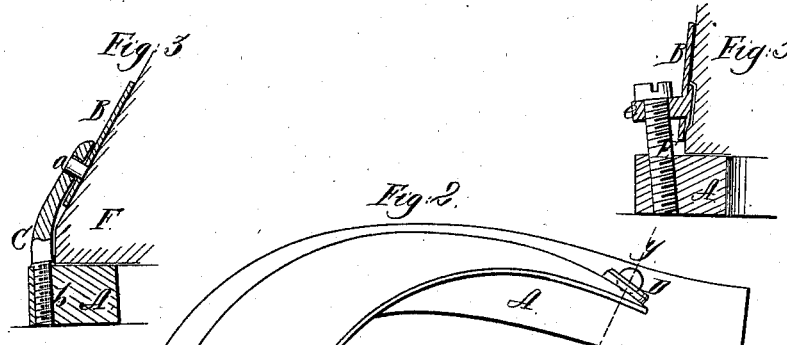

LAUREN CARPENTER, OF LAKE CITY, MINNESOTA.

IMPROVED MODE OF SECURING SHOES TO HORSES' FEET.

Specification forming part of Letters Patent No. 43,179, dated June 21, 1864.

*To all whom it may concern:*

Be it known that I, LAUREN CARPENTER, of Lake City, in the county of Wabashaw and State of Minnesota, have invented a new and Improved Mode of Securing Shoes to the Feet or Hoofs of Horses; and I do hereby declare that the following is a full, clear, and exact description thereof, which will enable others skilled in the art to make and use the same, reference being had to the accompanying drawings, making a part of this specification, in which—

Figure 1 is a side view of my invention applied to the hoof of a horse; Fig. 2, a detached plan or top view of the same; Fig. 3, a section of the same taken in the line $xx$, Fig. 2; Fig. 4, a section of the same taken in the line $yy$, Fig. 2; Fig. 5, a section of the same taken in the line $zz$, Fig. 2.

Similar letters of reference indicate like parts.

This invention consists in a new and improved mode of securing the shoe to the foot of hoof of the horse, whereby nails are dispensed with and the shoe rendered capable of being readily attached to and detached from the foot or hoof, and also capable of having its parts readily adjusted to compensate for the growth of the hoof.

The object of the invention is to admit of shoes being applied to and detached from the feet or hoofs of horses by any one familiar or used to the same without the aid of a shoer or smith, so that when a horse is not in use the shoes may be removed in a moment of time and the animal allowed to go unshod and the feet remain in their natural condition to recuperate strength and health, and avoid the numerous ailments which continued shoeing is liable to induce, as well as the injury done to the hoof by the repeated nailing of the shoe thereto.

A represents a shoe which may be of the usual form and provided with the usual calks or not, as desired. The shoe may be flat or smooth at its bottom, as no nail-holes are required.

B is a band constructed of thin sheet metal, so as to have a certain degree of elasticity. This band extends some distance upward on the hoof, and is bent or curved so as to encompass the same, it being rather deeper or broader at its front than at its back parts, as shown clearly in Fig. 1.

To the front end of the band B, at its lower part, there is secured by one or more rivets, $a$, a rod, C, having a screw, $b$, cut on its lower end to screw into the front part or toe of the shoe, (see Fig. 3;) and D is a similar rod, which is attached by a screw, $c$, to the band, at the inner side of the hoof near its back part, the rod D also having a screw, $d$, cut on its lower end to screw into the shoe A. (See Fig. 4.)

To the back part of the band B, at its opposite side, there is permanently secured a projecting ear or lug, $e$, through which a screw, E, passes into the shoe. (See Fig. 5.) By this means the band B is snugly secured to the hoof F, and also the shoe A. In order to detach the shoe, all that is required is simply to remove or loosen the screw E, which is designed to be at the outer side of each shoe.

In order to compensate for the growth of the hoof, the screw E is detached from the shoe, and the rod D detached from the band by removing the screw $c$. The band B is then turned around to the left to raise the rod C, and the rod D turned a corresponding number of times. This elevates the band B, and causes it to clasp the hoof where it is smaller in diameter.

I would remark that the rod C is designed to fit into a notch in the front part of the hoof, to insure the shoe being adjusted to the hoof in the same place each time it is applied.

Having thus described my invention, what I claim as new, and desire to secure by Letters Patent, is—

The elastic band B, in connection with the shoe A, screw-rods C D, and screw E, all arranged substantially as and for the purpose herein set forth.

LAUREN CARPENTER.

Witnesses:
CLINTON STERRY,
JOHN FLETCHER.